(12) United States Patent
Suzuki et al.

(10) Patent No.: US 7,245,983 B2
(45) Date of Patent: Jul. 17, 2007

(54) METHOD AND APPARATUS FOR CORRECTING THERMAL DISPLACEMENT OF MACHINE TOOL

(75) Inventors: Yasuhiko Suzuki, Aichi pref. (JP); Makoto Tanahashi, Aichi pref. (JP)

(73) Assignee: Yamazaki Mazak Corporation, Aichi Pref. (JP)

( * ) Notice: Subject to any disclaimer, the term of this patent is extended or adjusted under 35 U.S.C. 154(b) by 0 days.

(21) Appl. No.: 11/255,649

(22) Filed: Oct. 20, 2005

(65) Prior Publication Data

US 2006/0089745 A1   Apr. 27, 2006

(30) Foreign Application Priority Data

Oct. 22, 2004   (JP)   ............................. 2004-308156

(51) Int. Cl.
*G06F 19/00* (2006.01)
(52) U.S. Cl. ...................... 700/177; 700/174; 700/176; 700/178
(58) Field of Classification Search ................ 700/174, 700/176, 177, 188
See application file for complete search history.

(56) References Cited

U.S. PATENT DOCUMENTS

| | | | |
|---|---|---|---|
| 6,471,451 B2 * | 10/2002 | Kojima et al. ............. | 409/131 |
| 6,651,019 B2 * | 11/2003 | Mizuguchi et al. .......... | 702/94 |
| 2002/0004688 A1 * | 1/2002 | Kojima et al. ............. | 700/193 |
| 2002/0189120 A1 * | 12/2002 | Kaneda et al. ............. | 33/636 |

FOREIGN PATENT DOCUMENTS

| | | | |
|---|---|---|---|
| JP | 62044351 A | * | 2/1987 |
| JP | 01222843 A | * | 9/1989 |
| JP | 3151655 | | 9/1997 |
| JP | 11-338527 | | 12/1999 |

OTHER PUBLICATIONS

"Improving CNC Machining Accuracy Through Thermal Model Based Control" -Michaloski et al, Proceedings of JUSFA'04, 2004 Japan—USA Symposium on Flexible Automation, Jul. 19-21, 2004.*
"Extreme High Precision Machining Center With New Effective Thermal Displacement Countermeasures", -Kura et al, Mitsubishi Heavy Industries, Ltd. Technical Review vol. 39, No. 3, Oct. 2002.*
"A Real Time Thermal Innacuracy Compensation Method on Machining Centre"—Tseng et al, National Chung Hsing University Department of Mechanical Engineering, 1997.*
"A Study of High-Precision CNC Lathe Thermal Errors and Compensation", -Tseng et al, National Chung Hsing University Department of Mechanical Engineering, 2002.*

* cited by examiner

*Primary Examiner*—Michael D. Masinick
(74) *Attorney, Agent, or Firm*—Sheridan Ross P.C.

(57) ABSTRACT

A method corrects thermal displacement of a machine tool having a rotational spindle. The method includes detecting a rotation speed of the spindle. A thermal displacement amount of the spindle in the current cycle of execution of a program is estimated by using an arithmetic expression that is based at least on the spindle rotation speed and a thermal displacement amount that has been estimated in the preceding cycle of execution of the program. The estimated thermal displacement amount in the current cycle is used as a correction amount for canceling the thermal displacement of the spindle. Therefore, thermal displacement of a machine tool is corrected with no complicated processes when a spindle rotation speed changes.

15 Claims, 9 Drawing Sheets

| Sampling No. | Thermal Displacement $S_n$ ($\mu m$) | Thermal Displacement $S_{n-1}$ ($\mu m$) | Spindle Rotation Speed $\omega$ (min$^{-1}$) | Spindle Rotation Speed $\omega^2$ (min$^{-1}$)$^2$ | Spindle Rotation Speed $\omega^3$ (min$^{-1}$)$^3$ | Thermal Displacement $S_{n-1}$ × Rotation Speed $\omega$ ($\mu m \cdot$ min$^{-1}$) |
|---|---|---|---|---|---|---|
| 1 | 0 | 0 | 0 | 0 | 0 | 0 |
| 2 | 0 | 0 | 1000 | 1000000 | 1.0e9 | 0 |
| 3 | 0.1 | 0 | 1000 | 1000000 | 1.0e9 | 0 |
| 4 | 0.1 | 0.1 | 1000 | 1000000 | 1.0e9 | 100 |
| 5 | 0.2 | 0.1 | 1000 | 1000000 | 1.0e9 | 100 |
| 6 | 0.3 | 0.2 | 2000 | 4000000 | 8.0e9 | 400 |
| 7 | 0.3 | 0.3 | 2000 | 4000000 | 8.0e9 | 600 |
| . | . | . | . | . | . | . |

Fig. 12

METHOD AND APPARATUS FOR CORRECTING THERMAL DISPLACEMENT OF MACHINE TOOL

BACKGROUND OF THE INVENTION

The present invention relates to a method and an apparatus for correcting thermal displacement of a machine tool. Specifically, the present invention relates to a method and an apparatus for correcting thermal displacement of a machine tool caused by heat generated by rotation of a spindle.

In general, parts of a machine tool can be heat sources. Heat sources include rolling bearings of a spindle. Such rolling bearings produce friction heat. Heat generated by heat sources of machine tool parts causes thermal displacement at the machine tool having the spindle. Thermal displacement of a machine tool adversely affects machining accuracy of the machine tool. Accordingly, various types of methods and apparatus for correcting thermal displacement have been conventionally proposed.

Japanese Patent No. 3151655 discloses a method for correcting thermal displacement that is performed on the precondition that thermal displacement is proportionate to the amount of increase of the difference between the temperature of a spindle and the room temperature. The correction method includes a step for measuring temperatures of various parts of a machine tool, and a step for filtering temperature data obtained through measuring to estimate the amount of thermal displacement in each part of the machine tool. The time constant of the filter is changed in accordance with a spindle rotation speed and the rotation time of the spindle at the specific spindle rotation speed. When the spindle rotation speed decreases, an intermediate value of the temperature is obtained by means of an arithmetic expression to quickly estimate the thermal displacement amount that corresponds to the decrease of the spindle rotation speed. Further, the difference between the measured temperature data and the intermediate value for estimation is calculated, and the calculated difference is deleted from the temperature data. The deleted amount is reduced on the first-order lag. Based on the input temperature thus obtained, thermal displacement amount is computed.

The thermal displacement correction method according to claim 2 of Japanese Laid-Open Patent Publication No. 11-338527 focuses on heat generation and heat radiation about a spindle. The method obtains heat accumulation in a spindle based on the heat generation amount and the heat radiation amount about the spindle. Further, based on the heat accumulation, the thermal displacement amount of the spindle is calculated. The thermal displacement correction is executed based on the thermal displacement amount.

As described above, Japanese Patent 3151655 corrects thermal displacement on the precondition that the thermal displacement is proportionate to the temperature of the machine tool. As long as the machine tool is in a steady state, thermal displacement is accurately corrected by the method. However, immediately after the spindle rotation speed changes, the changed time constant of the thermal displacement does not match with the change time constant of the measured temperature. Thus, the thermal displacement cannot be easily corrected in an appropriate manner. In Japanese Patent No. 3151655, the thermal displacement amount is computed directly from the measured temperature data. Therefore, the amount of adjustment of the filter needs to be estimated every time the conditions change. Also, when the spindle rotation speed changes as described above, particularly complicated processes need to be executed.

Japanese Laid-Open Patent Publication No. 11-338527 will now be discussed. Heat radiation effect of components about a spindle depends on the relative velocity between a cooling medium and cooled objects (the components about the spindle). In actuality, cooling of the components about the spindle (for example, bearings) is closely related to the spindle rotation speed. When the spindle rotation speed increases and the heat generation amount increases, accordingly, the heat radiation amount also increases. That is, the time constant when thermal displacement increases due to an increase in the spindle rotation speed varies depending on the amount of increase in the spindle rotation speed. Likewise, the time constant varies when thermal displacement decreases due to a decrease in the spindle rotation speed. In this manner, the conditions of both of the heat generation and heat radiation change according to changes in the spindle rotation speed. Therefore, the estimation of thermal displacement by separately obtaining heat generation and heat radiation is difficult and not practical.

SUMMARY OF THE INVENTION

Accordingly, it is an objective of the present invention to provide a method and an apparatus for correcting thermal displacement of a machine tool that require no complicated processes when a spindle rotation speed, which is used for computing thermal displacement, changes, and eliminate the necessity for separately measuring heat generation and heat radiation.

It is another objective of the present invention to provide a method and an apparatus for correcting thermal displacement of a machine tool that properly predict thermal displacement even if a spindle rotation speed changes, and, as a result, is capable of appropriately correcting thermal displacement.

To achieve the above-mentioned objective, the present invention provides a method for correcting thermal displacement of a machine tool having a rotation spindle. The method includes detecting a rotation speed of the spindle; estimating a thermal displacement amount of the spindle in the current cycle of execution of a program by using an arithmetic expression that is based at least on the spindle rotation speed and a thermal displacement amount that has been estimated in the preceding cycle of execution of the program; and using the estimated thermal displacement amount in the current cycle as a correction amount for canceling the thermal displacement of the spindle.

Further, the present invention provides an apparatus for correcting thermal displacement of a machine tool having a rotation spindle. The apparatus includes a spindle rotation speed detection section for detecting a rotation speed of the spindle. A thermal displacement estimation section estimates a thermal displacement amount of the spindle in the current cycle of execution of a program by using an arithmetic expression that is based at least on the spindle rotation speed and a thermal displacement amount that has been estimated in the preceding cycle of execution of the program. A correction section uses the estimated thermal displacement amount in the current cycle as a correction amount for canceling the thermal displacement of the spindle.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An apparatus for correcting thermal displacement according to a first embodiment of the present invention will now be described with reference to FIGS. 1 to 6. The thermal displacement correcting apparatus of the first embodiment is realized as a CNC apparatus (numerical control apparatus) 100 installed in a horizontal machining center 10 serving as a machine tool.

Figure 1:
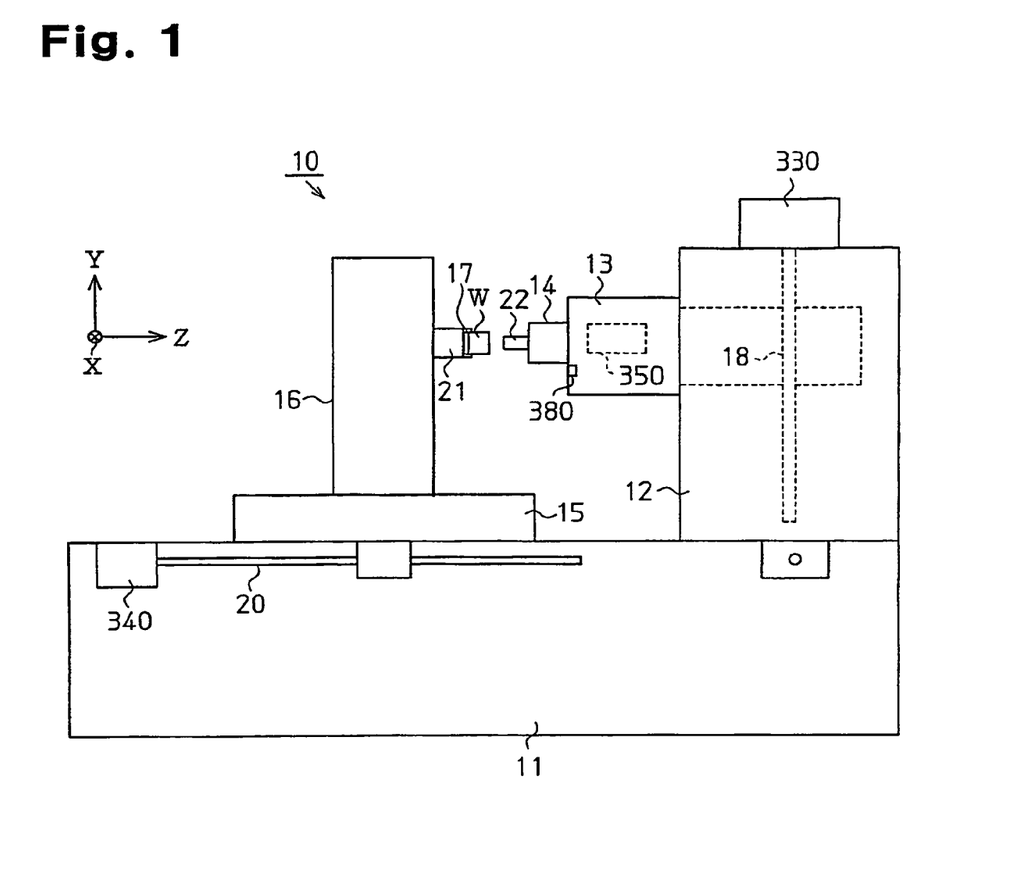
FIG. 1 is a schematic diagram showing a horizontal machining center according to a first embodiment of the present invention.

FIG. 1 is a schematic diagram of the horizontal machining center 10. As shown in FIG. 1, the horizontal machining center 10 has a conventional structure and includes a bed 11, a column 12, a spindle head 13, a spindle 14, a movable table 15, an angle plate 16, and a chuck device 17. In FIG. 1, the direction perpendicularly away from the sheet is defined as the X-axis direction, the direction from the top toward the bottom is defined as the Y-axis direction, and the direction toward the right is defined as the Z-axis direction. Displacement of the spindle 14 in a direction away from a workpiece W is expressed as a positive displacement along the Z-axis direction, and displacement of the spindle 14 in a direction toward the workpiece W is expressed as a negative displacement along the Z-axis direction.

The column 12 is arranged on the bed 11 to be movable along the X-axis direction. The column 12 is driven by an X-axis motor 320 (see FIG. 2). The spindle head 13 is attached to the column 12 in such a manner that the spindle head 13 is movable along the Y-axis direction. The spindle head 13 is driven by a Y-axis motor 330 with a ball screw 18. The movable table 15 is provided on the bed 11 to be movable along the Z-axis direction. The movable table 15 is driven by a Z-axis motor 340 with a ball screw 20, which serves as a feed rod. The X-axis motor 320, the Y-axis motor 330, and the Z-axis motor 340 are servo motors. A workpiece holder 21 is provided on the angle plate 16 on the movable table 15. The workpiece holder 21 detachably holds the workpiece W. The workpiece holder 21 includes the chuck device 17.

The spindle 14 is rotatably supported by a bearing provided in the spindle head 13. The spindle 14 is rotated by a built-in spindle motor 350 in the spindle head 13. A working attachment 22 is attached to the spindle 14.

Figure 2:
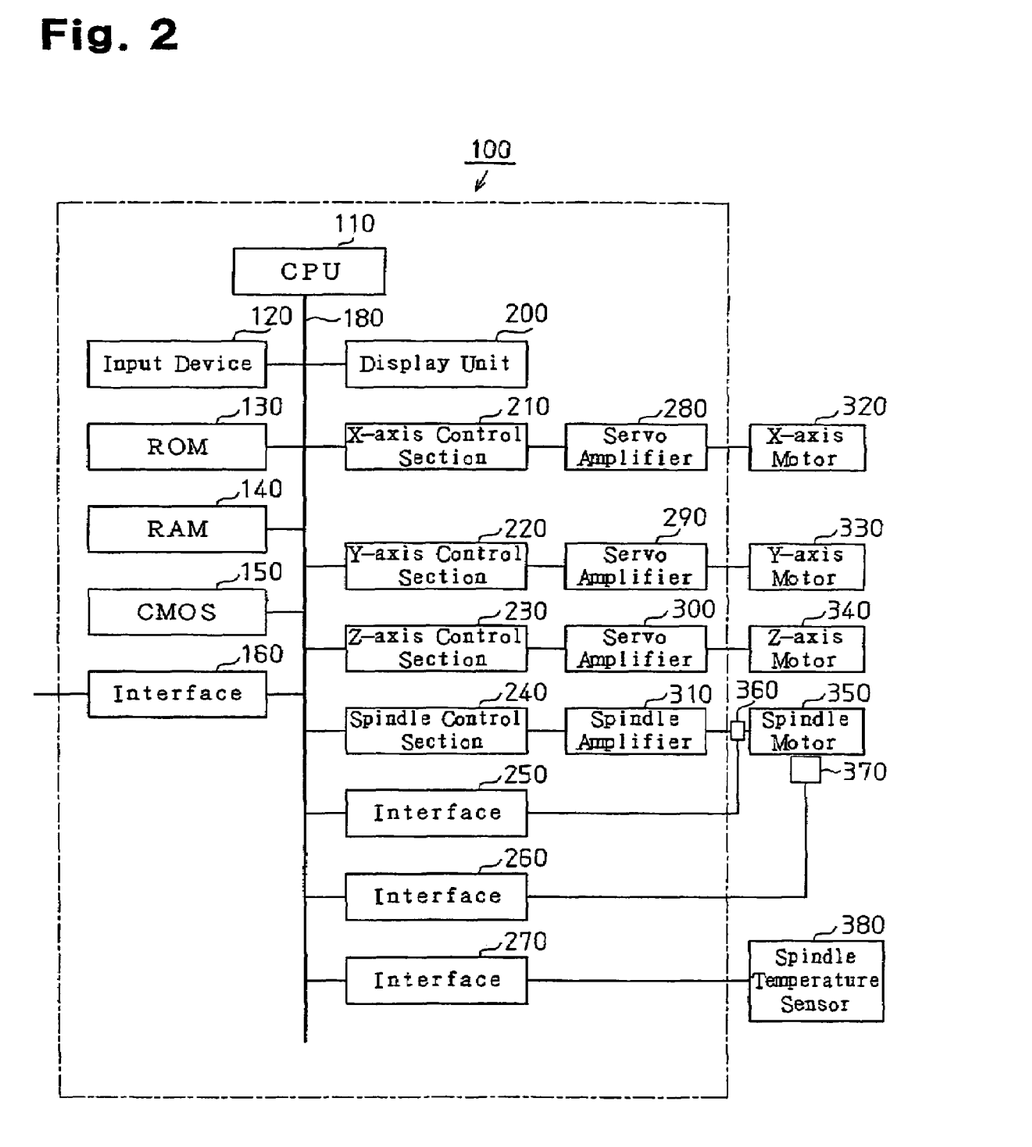
FIG. 2 is a block diagram showing functions of a CNC apparatus 100 incorporated in the machining center shown in FIG. 1.

FIG. 2 is a block diagram showing functions of the CNC apparatus 100 incorporated in the horizontal machining center 10 shown in FIG. 2.

A central processing unit (CPU) 110 of the CNC apparatus 100 controls the entire CNC apparatus 100. The CPU 110 is connected to a display unit 200, an X-axis control section 210, a Y-section control section 220, a Z-axis control section 230, a spindle control section 240, interfaces 250 to 270 through bus line 180. The display unit 200 includes an input device 120, a ROM 130, a RAM 140, a CMOS 150, an interface 160, and a liquid crystal display.

The input device 120 includes the display unit 200 and a keyboard from which data can be inputted. The ROM 130 stores various types of system programs for controlling the entire CNC apparatus 100.

The RAM 140 stores temporary calculation data, display data, and various types of data inputted from the input device 120 by an operator.

The CMOS 150 is backed up by a battery (not shown). The CMOS 150 is a nonvolatile memory that retains stored data even if the CNC apparatus 100 is turned off. The CMOS 150 stores program data such as a thermal displacement correction program. The interface 160 is used for external devices connectable to the CNC apparatus 100. For example, the interface 160 is connected to external devices (not shown) such as a paper tape reader, a paper tape puncher, and an external memory device. The paper tape reader and the external memory device are capable of inputting machining programs and the thermal displacement correction program to the interface 160.

The X-axis control section 210 receives an X-axis position control command from the CPU 110 and outputs the command to a servo amplifier 280. Based on the position command, the servo amplifier 280 drives the X-axis motor 320 to move the column 12 along the X-axis direction.

The Y-axis control section 220 receives a Y-axis position control command from the CPU 110 and outputs the command to a servo amplifier 290. Based on the position command, the servo amplifier 290 drives the Y-axis motor 330 to move the spindle head 13 along the Y-axis direction.

The Z-axis control section 230 receives a Z-axis position control command from the CPU 110 and outputs the command to a servo amplifier 300. Based on the position command, the servo amplifier 300 drives the Z-axis motor 340 to move the movable table 15 along the Z-axis direction.

The X-axis, Y-axis, Z-axis motors 320, 330, 340 each have a pulse coder (not shown) for detecting positions. The pulse coders feed position signals as pulse trains back to the X, Y, Z-axis control sections 210, 220, 230, respectively. Instead of pulse coders, linear scales may be used to detect the positions of the column 12, the spindle head 13, and the movable table 15. Based on the position signals, the X, Y, Z-axis control sections 210, 220, 230 can perform conventional position feedback control and speed feedback control along the X, Y, and Z axes.

The spindle control section 240 shown in FIG. 2 receives a spindle rotation control command from the CPU 110, and outputs a spindle speed signal to a spindle amplifier 310. Based on the spindle speed signal, the spindle amplifier 310 rotates the spindle motor 350 at the commanded rotation speed (the rotation speed of the spindle 14), thereby driving the working attachment 22.

A motor current sensor 360 detects the motor current of the spindle motor 350, and inputs a motor current direction signal to the CPU 110 through an interface 250. The detected motor current is used for a conventional current feedback control performed by the spindle amplifier 310.

A rotation speed sensor 370 of the spindle is formed, for example, of a rotary encoder, and generates rotation pulses in synchronization with rotation of the spindle motor 350. The rotation speed sensor 370 inputs the rotation pulse signal to the CPU 110 through the interface 260. As shown in FIG. 1, a spindle temperature sensor 380 is located in the spindle head 13 in the vicinity of the spindle 14 and detects the spindle temperature. The spindle temperature sensor 380 inputs the temperature detection signal to the CPU 110 through the interface 270.

The operations of the CNC apparatus 100 formed as described above will now be described.

Figure 3:
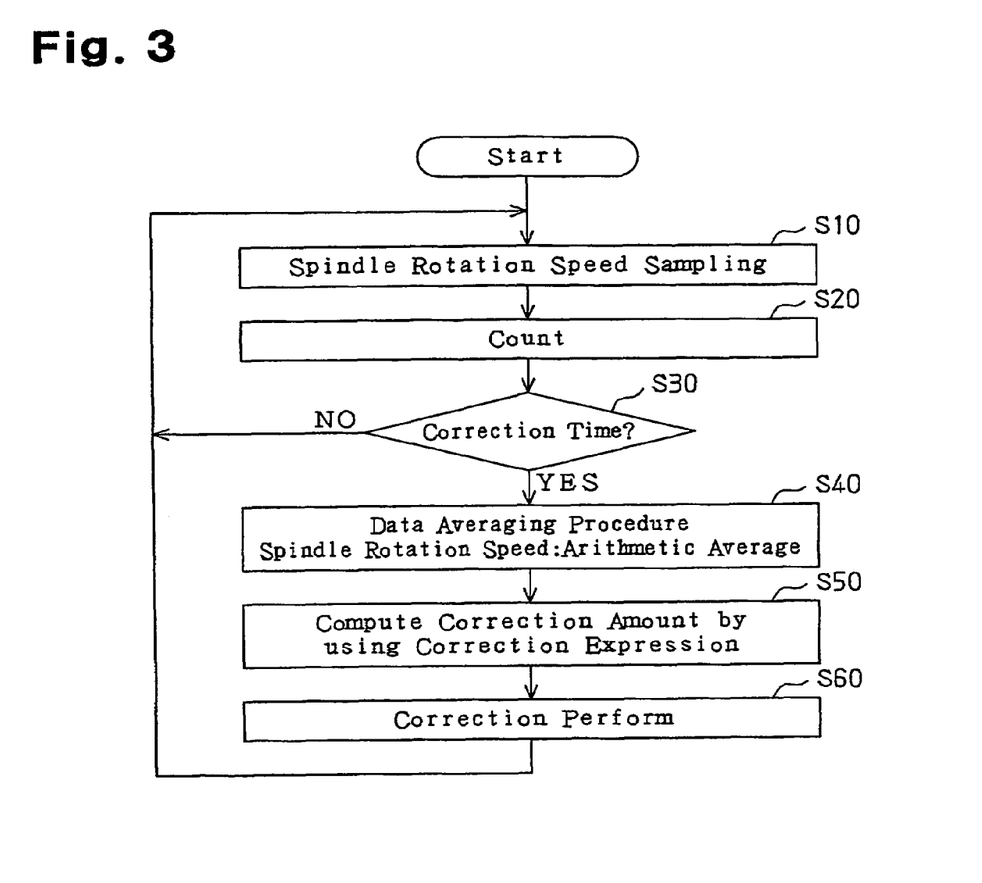
FIG. 3 is a flowchart showing a thermal displacement correction program executed by the CPU 110 shown in FIG. 2.

FIG. 3 is a flowchart showing a thermal displacement correction method performed by the CPU 110 according to the thermal displacement correction program.

(Step S10)

When the program is started, the CPU 110 samples, at step S10, the rotation speed of the spindle 14 based on a rotation pulse signal from the rotation speed sensor 370 of the spindle 14, and a motor current detection signal from the motor current sensor 360.

(Step S20)

At step S20, the CPU 110 increments a counter (not shown) by one.

(Step S30)

At step S30, the CPU 110 determines whether the count value of the counter has reached a correction time. If the count value has not reached the correction time, the CPU 110 returns to step S10. If the count value has reached the correction time, the CPU 110 proceeds to step S40. A plurality of correction times are set at a predetermined interval, for example, every few seconds.

(Step S40)

At step S40, the CPU 110 performs a data averaging procedure. Specifically, the CPU 110 computes the mean value of values of the rotation speed of the spindle 14, which have been consecutively sampled at step S10. The CPU 110 uses the mean value of the rotation speed of the spindle 14 in a correction expression at step S50. The mean value of the rotation speed of the spindle 14 is represented by $\omega$. The mean value of the rotation speed of the spindle 14 is computed as an arithmetic average in the first embodiment.

(Step S50)

At step S50, the CPU 110 computes a correction amount using the correction expression. In the first embodiment, the following equation is used as the correction expression.

$$S_n = b_1 \cdot S_{n-1} + b_2 \cdot \omega + b_3 \cdot \omega^2 + b_4 \cdot \omega^3 + b_5 \cdot S_{n-1} \cdot \omega \quad (3)$$

Using the expression (3), the correction amount of the thermal displacement amount of the spindle 14, that is, a thermal displacement amount $S_n$ of the current execution of the program is computed. The computed thermal displacement amount $S_n$ will hereafter be referred to as the current thermal displacement amount $S_n$. $S_{n-1}$ represents the thermal displacement amount in the preceding execution of the program. The coefficients $b_1$ to $b_5$ in the expression (3) are determined in advance based on test data. The CPU 110 executing step S50 corresponds to a thermal displacement amount estimation section. The thermal displacement amount of the spindle 14 refers to displacement of the spindle 14 in the axial direction caused by thermal displacement of the entire machine tool, or the entire horizontal machining center 10.

(Step S60)

At step S60, the CPU 110 corrects the Z-axis position control command based on the correction amount computed by means of the correction expression, then returns to step S10. That is, the CPU 110 corrects the Z-axis coordinate of the spindle 14 with respect to the axial direction of the feed rod (the ball screw 20). The correction cancels the thermal displacement of the spindle 14. The CPU 110 executing the correction corresponds to a correction section.

Hereinafter, the thermal displacement of the spindle 14 due to the rotation speed $\omega$ will be described.

(Displacement Estimation Surface V Based on Rotation Speed $\omega$ of Spindle 14)

The rotation speed $\omega$ of the spindle 14 affects the friction (mechanical loss) of the bearing that rotatably supports the spindle 14 and the magnetic loss (core loss) of the spindle motor 350 that rotates the spindle 14. That is, the rotation speed $\omega$ of the spindle 14 is strongly correlated with the thermal displacement of the spindle 14.

Hereinafter, on the evaluation of thermal displacement, thermal displacement correction in which the rotation speed $\omega$ of the spindle 14 is discretely changed at a certain interval will be discussed.

The higher the rotation speed $\omega$ of the spindle 14, the greater the amount of thermal displacement of the spindle 14 becomes. Also, if the spindle 14 is rotated at a high speed when the amount of thermal displacement of the spindle 14 is small, the amount of the thermal displacement of the spindle 14 rapidly increases. If the spindle 14 is stopped after rotating at a high speed, the thermal displacement decreases. The time constant of increase the thermal displacement of the spindle 14 can be different from the time constant of decrease in the thermal displacement.

Figure 12:
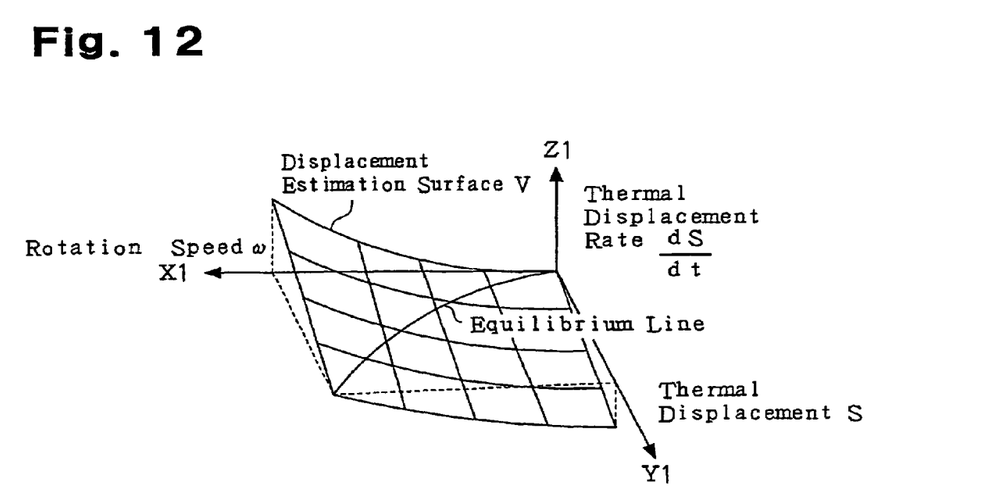
FIG. 12 is a diagram for explaining the response surface methodology according to the program of FIG. 3.

Accordingly, using polynomials, the rate of the thermal displacement of the spindle 14 is estimated by means of the combination of the rotation speed $\omega$ of the spindle 14 and the thermal displacement amount S of the spindle 14. As shown in FIG. 12, the rotation speed $\omega$ of the spindle 14 is set along the X1 axis, the thermal displacement amount S of the spindle 14 is set along the Y1 axis, the thermal displacement rate (dS/dt) of the spindle 14 is set along the Z1 axis. Then, the polynomial of the thermal displacement amount S is expressed as a surface V. The X1 axis and the Y1 axis define a horizontal plane, and the Z1 axis define a vertical axis. The line of intersection of displacement estimation surface V and the horizontal plane that is a surface of the displacement rate dS/dt=0 indicates an equilibrium line. A point on the estimation surface V moves along the equilibrium line. That is, when machine tool is in the steady state, points representing the state of the spindle 14, that is, points representing the rotation speed $\omega$ of the spindle 14, the thermal displacement amount S, and thermal displacement rate (dS/dt) converge on the equilibrium line on the estimation surface V. In other words, the points representing the state of the spindle 14 do not diverge.

As in the following expression (1), the displacement estimation surface V can be expressed by a polynomial of the rotation speed ω of the spindle 14 and the thermal displacement amount S.

$$dS/dt = a_1 \cdot S + a_2 \cdot \omega + a_3 \cdot \omega^2 + a_4 \cdot \omega^3 + a_5 \cdot S \cdot \omega \quad (1)$$

If the expression (1) is digitally processed at the sampling period Δt of the rotation speed of the spindle 14, the following expression (2) is obtained.

$$(S_n - S_{n-1})/\Delta t = a_1 \cdot S_{n-1} + a_2 \cdot \omega + a_3 \cdot \omega^2 + a_4 \cdot \omega^3 + a_5 \cdot S_{n-1} \cdot \omega \quad (2)$$

The equations $b_1 = 1 + \Delta t \cdot a_1$, $b_2 = \Delta t \cdot a_2$, $b_3 = \Delta t \cdot a_3$, $b_4 = \Delta t \cdot a_4$, $b_5 = \Delta t \cdot a_5$ are applied to the expression (2) to obtain the following expression (3).

$$S_n = b_1 \cdot S_{n-1} + b_2 \cdot \omega + b_3 \cdot \omega^2 + b_4 \cdot \omega^3 + b_5 \cdot S_{n-1} \cdot \omega \quad (3)$$

$S_n$ represents the estimated thermal displacement amount in the current sampling, that is, the current thermal displacement amount. $S_n$ is estimated using the expression (3) based on the rotation speed ω of the spindle 14 and the thermal displacement amount $S_{n-1}$, which was estimated in the preceding sampling.

Figure 11:
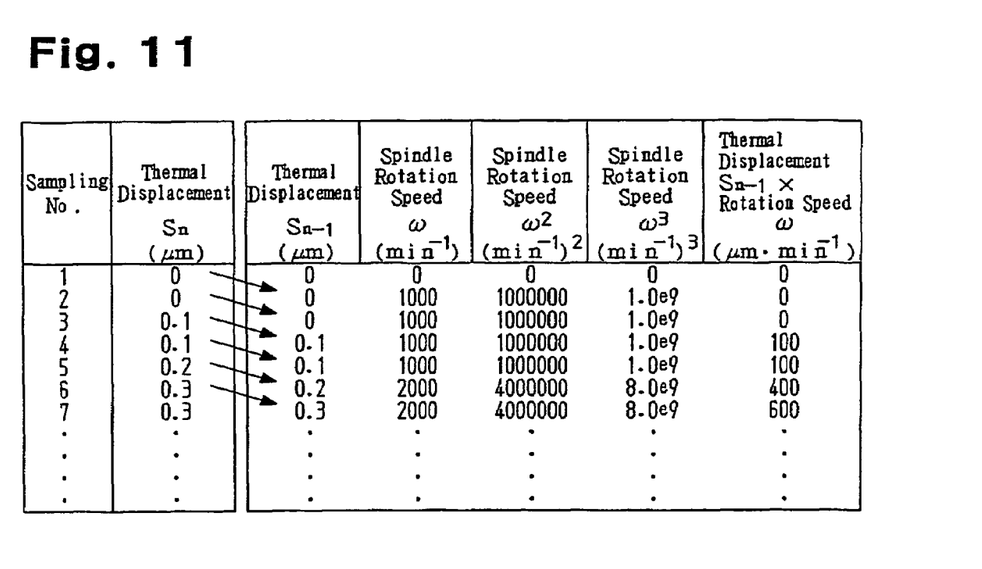
FIG. 11 is a diagram showing an example of computation of a thermal displacement amount $S_n$ and a spindle rotation speed $\omega$ according to the program of FIG. 3.

The dimensions of the coefficients $a_1$ to $a_5$, and $b_1$ to $b_5$ are set in such a manner that $S_n$ is ultimately computed. For example, the dimension of the coefficient $b_1$ is set in such a manner that the product of the coefficient $b_1$ and $S_{n-1}$ matches with the dimension of $S_n$. The coefficients $a_1$ to $a_5$, and $b_1$ to $b_5$ in the expression (3) are obtained by performing a regression analysis using various measurement data. FIG. 11 is a chart showing an example in which the thermal displacement amount and the rotation speed ω of the spindle 14 are sampled at certain times. Specifically, FIG. 11 shows the sampled values of the thermal displacement amount $S_n$ and the rotation speed ω of the spindle 14. Based on the test data thus obtained, the coefficients $b_1$ to $b_5$ are obtained through a regression analysis.

The expression (3) is obtained based on the response surface methodology.

The response surface is a surface that approximates a relational expression between $x_i$ (i=1 . . . , n), or predictor variables the number of which is represented by n (n>1), and a response y predicted from the predictor variables $x_i$ (i= 1 . . . , n). The response y is expressed by the following expression (4).

$$y = f(x_1, \ldots, x_n) + \epsilon \quad (4)$$

In the expression (4), ε is referred to as an error. The form of function f is not limited in the response surface methodology. For example, a quadratic polynomial, a cubic polynomial, a quartic polynomial, and a nonlinear function may be used.

In the arithmetic expression (3), the variable $x_i$ is the rotation speed ω of the spindle 14 and the thermal displacement amount $S_{n-1}$, which is estimated in the preceding execution of the program, and the thermal displacement amount $S_n$, which is estimated in the current execution, corresponds to the response y. In this manner, by obtaining the expression (3) through the response surface methodology, the arithmetic expressions for the thermal displacement amount $S_n$ are easily realized.

In the expression (3), the rotation speed ω of the spindle 14 and the thermal displacement amount $S_{n-1}$, which was estimated in the preceding execution, are used as variables to estimate the current thermal displacement amount $S_n$. For example, for a machine tool such as a die sinking machine in which the spindle 14 continues rotating at a constant spindle rotation speed ω, the current thermal displacement amount $S_n$ obtained using the expression (3) is an estimated value that is sufficiently appropriate. In this manner, since the thermal displacement amount $S_n$ is computed based on the rotation speed ω of the spindle 14, which is a source of the thermal displacement, the thermal displacement amount $S_n$ is reliably predicted even if the rotation speed ω of the spindle 14 changes. As a result, the thermal displacement of the spindle 14 is properly corrected.

When the spindle 14 rotates, heat is generated at various portions of the horizontal machining center 10. That is, rotation of the spindle 14 causes heat to be generated in various portions of the machining center 10 for various reasons. For example, rotation of the spindle 14 causes frictional heat to be generated at the bearings supporting the spindle 14, and the spindle motor 350, which is an electric motor serving as a driving device for rotating the spindle 14, to electrically generate heat.

If the heat thus generated remains only in the spindle 14 and the spindle motor 350, the heat causes nothing but thermal expansion of the spindle 14. However, heat generated in the spindle 14 and the spindle motor 350 is propagated to various portions of the horizontal machining center 10. Depending on the manner of the heat propagation, the horizontal machining center 10 is deformed in a complicated manner. This affects machining accuracy of the work piece W, which is an object to be machined.

The method and the apparatus for correcting thermal displacement of a machine tool according to the present embodiment are capable of correcting an error (displacement) in the relative positions between the edge of the working attachment 22 attached to the spindle 14 and the workpiece W, which is an object to be machined, due to deformation of the horizontal machining center 10.

The relationship between the polynomial of the expression (3) and heat generation/heat radiation at the spindle 14 and its bearing will now be described.

(Relationship Between Polynomial and Heat Generation/Heat Radiation)

The terms of the polynomial (3) have the following meanings.

In the expression (3), the terms related to heat generation are the terms $b_2 \cdot \omega$, $b_3 \cdot \omega^2$, and $b_4 \cdot \omega^3$. The terms related to heat radiation are the terms $b_1 \cdot S_{n-1}$ and $b_5 \cdot S_{n-1} \cdot \omega$.

The term $b_2 \cdot \omega$ is derived from the fact that energy loss of the spindle 14 due to Coulomb friction is proportionate to the rotation speed ω of the spindle 14, and that the hysteresis loss of the core loss of the spindle motor 350 is proportionate to the rotation speed ω of the spindle 14.

The term $b_3 \cdot \omega^2$ is derived from the fact that energy loss of the spindle 14 due to viscous friction is proportionate to the square of the rotation speed ω of the spindle 14, and that the eddy-current loss of the core loss of the spindle motor 350 is proportionate to the square of the rotation speed ω of the spindle 14.

The term $b_4 \cdot \omega^3$ is derived from the fact that the centrifugal force generated by rotation of the spindle 14 is proportionate to the square of the rotation speed ω of the spindle 14, and that, as a result, the bearing preload of the spindle 14 is increased, and that the energy loss increased accordingly is proportionate to the cube of the rotation speed ω of the spindle 14.

The term $b_1 \cdot S_{n-1}$ is obtained to correspond to heat radiation state when the heat generation condition is zero, that is, when the rotation speed ω of the spindle 14 is zero.

As described above, the expression (3) includes at least the following terms.

A. a term having the precedingly estimated thermal displacement amount $S_{n-1}$ as a variable, B. a term having the rotation speed ω of the spindle 14, which is detected at a predetermined interval, as a variable, C. a term having the square of the rotation speed ω of the spindle 14 as a variable, and D. a term having the cube of the rotation speed ω of the spindle 14 as a variable.

"A. the term having the precedingly estimated thermal displacement amount as a variable" corresponds to $b_1 \cdot S_{n-1}$.

"B. the term having the rotation speed ω of the spindle 14, which is detected at a predetermined interval, as a variable" corresponds to $b_2 \cdot \omega$.

"C. the term having the square of the rotation speed ω of the spindle 14 as a variable" corresponds to $b_3 \cdot \omega^2$.

"D. the term having the cube of the rotation speed ω of the spindle 14 as a variable" corresponds to $b_4 \cdot \omega^3$.

Using the expression (3) having these terms allows the thermal displacement amount $S_n$ to be more accurately estimated compared to the conventional thermal displacement correction methods.

Further, the term $b_5 \cdot S_{n-1} \cdot \omega$ is obtained to correspond to the heat radiation state, which varies according to the heat generation condition.

That is, the arithmetic expression (3) includes not only the terms in which the variables ω, $S_{n-1}$ are independent from each other, but also terms in which the rotation speed ω of the spindle 14 is multiplied by the preceding thermal displacement estimation amount $S_{n-1}$. Therefore, the thermal displacement amount $S_n$ is further accurately estimated.

The characteristics of the first embodiment will now be described. Specifically, the characteristics of the case where the expression (3) is used in the first embodiment will be described.

A case in which the rotation speed of the spindle motor 350 is discretely increased according to the pattern shown in FIG. 4 will now be discussed. The rotation speed is represented by the number of rotations per minute of the spindle motor 350. More specifically, the number of rotations of the spindle 14 is increased by 2500 rotations per minute every one and half hours. Eventually, the number of rotations is increased to ten thousand rotations per minute before the spindle 14 is suddenly stopped.

Figure 4:
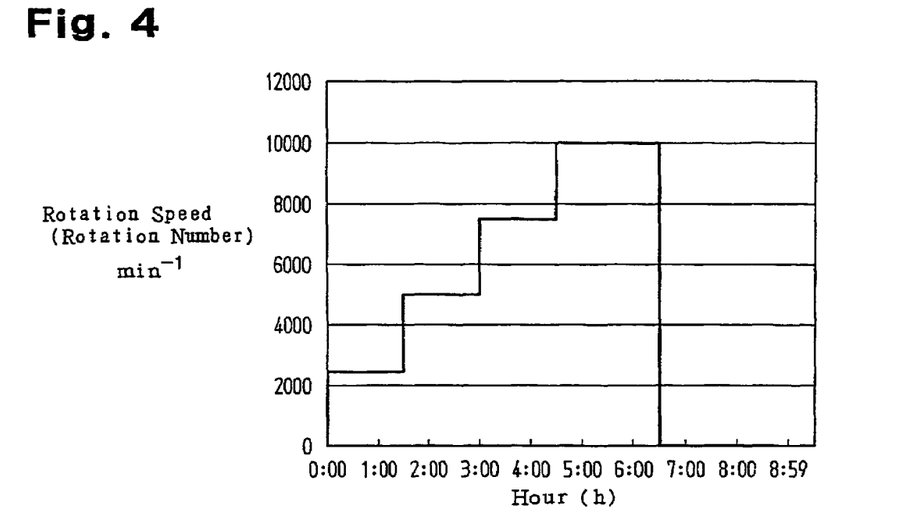
FIG. 4 is a diagram for explaining a pattern of the rotation speed of the spindle motor 350 shown in FIG. 2.
Figure 5:
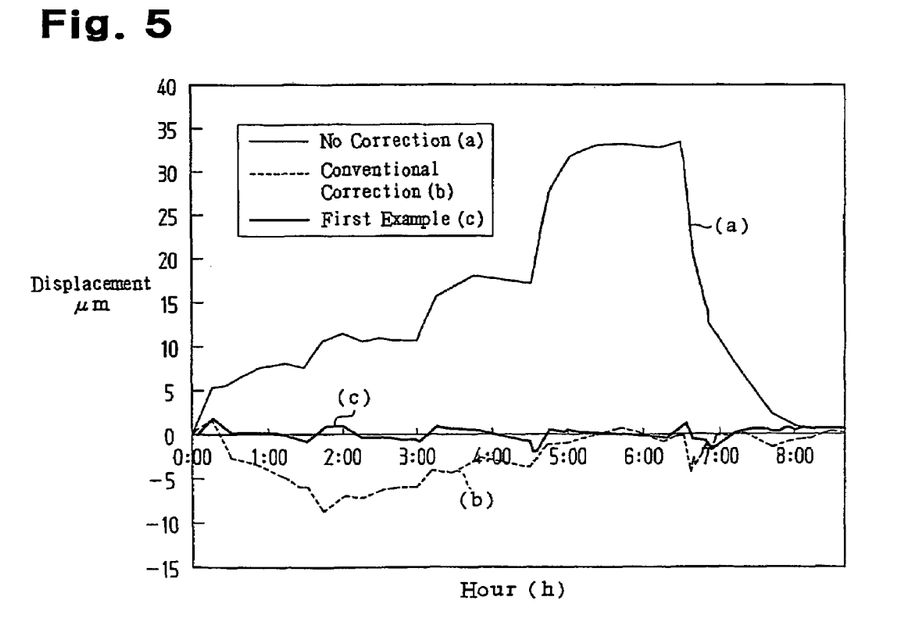
FIG. 5 is a diagram showing an example of the thermal displacement correction performed in the machining center of FIG. 1.

In FIG. 5, corresponding to the pattern of the rotation speed of the spindle motor 350 shown in FIG. 4, the displacement of the spindle 14 along the Z-axis direction (=actual displacement−correction amount) is plotted as a first comparison example (a), a second comparison example (b), and a first example (c). The first comparison example (a) represents a case where no correction is performed. The second comparison example (b) represents a case where conventional correction is performed. The first example (c) represents a case where correction is performed using the expression (3). The vertical axis of FIG. 5 represents displacement of the spindle 14 along the Z-direction (μm), the horizontal axis represents time (hour). The actual displacement of the spindle 14 is the actual thermal displacement in the case where no correction is performed.

As shown in FIG. 5, in the case of the first comparison example (a) "without correction", every time the rotation speed of the spindle 14 discretely changes according to the rotation speed of the spindle motor 350, the displacement of the spindle 14 is greatly increased. The conventional correction of the second comparison example (b) is based on the following expression.

Correction amount (prior art)=$(T_1-T_2) \times K$ $T_1$ represents the temperature of the spindle head 13. $T_2$ represents the temperature of the bed 11 of the horizontal machining center 10. K is a constant, which is an eigenvalue of a machine tool, or the horizontal machining center 10 of this example. In the second comparison example (b) of the conventional correction, a displacement of approximately −10 μm exists in the period between one and two hours of elapsed time. Thereafter, the absolute value of the displacement gradually decreases.

Compared to the second comparison example (b) of the conventional correction, the first example (c) of the first embodiment has the maximum displacement no greater than 2 μm. That is, even if the rotation speed of the spindle 14 increases stepwise, the displacement of the spindle 14 is within the range of approximately ±2 μm. Also, at six and half hours of elapsed time at which rotation of the spindle 14 stops, the displacement does not greatly change, and is in the range of approximately ±2 μm. That is, the displacement does not greatly fluctuate.

Instead of the expression (3) of the first embodiment, an expression (10), which is discussed below, may be used as a correction expression.

Figure 6:
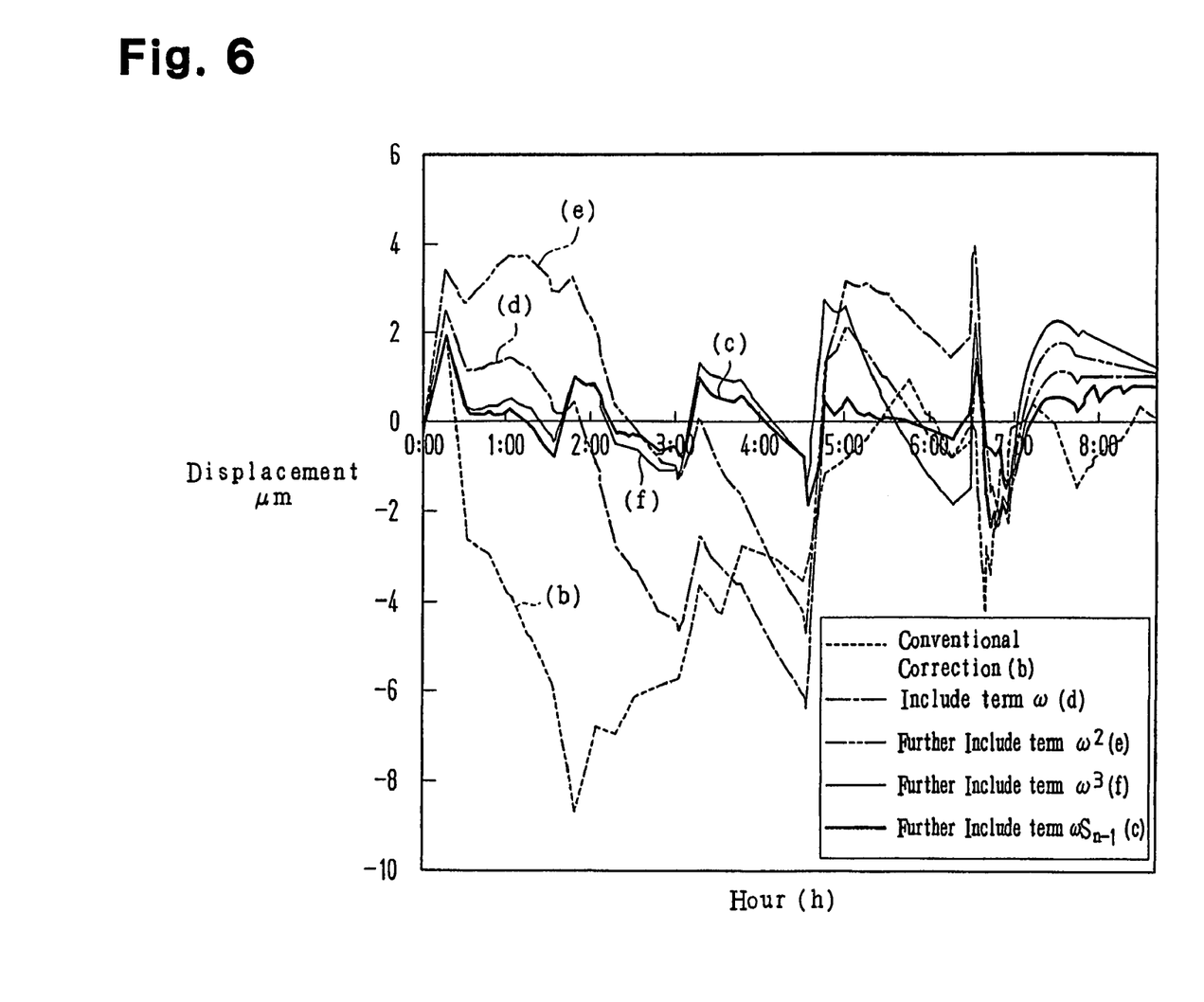
FIG. 6 is a diagram showing another example of the thermal displacement correction performed in the machining center of FIG. 1.

FIG. 6 shows the results of tests regarding the effectiveness of the expression (10). In addition to the second comparison example (b) and the first example (c), FIG. 6 shows three examples, or second to fourth examples (d) to (f).

In the second example (d), the second example (d) shows a case where a correction amount is computed using a correction expression (8) discussed below, and the displacement of the spindle 14 in the Z-axis direction (=actual displacement−correction amount) is computed. The third embodiment (e) shows a case where a correction expression (9) is used, and the fourth embodiment (f) shows a case where a correction expression (10) is used. The pattern of changes of the rotation speed of the spindle 14 as time elapses is the same as that of FIG. 4.

$$S_n = b_1 \cdot S_{n-1} + b_2 \cdot \omega \tag{8}$$

$$S_n = b_1 \cdot S_{n-1} + b_2 \cdot \omega + b_3 \cdot \omega^2 \tag{9}$$

$$S_n = b_1 \cdot S_{n-1} + b_2 \cdot \omega + b_3 \cdot \omega^2 + b_4 \cdot \omega^3 \tag{10}$$

As shown in FIG. 6, in the second example (d) of the expression (8) and the third example (e) of the expression (9), the displacement of the spindle 14 during the period between zero and one hour of elapsed time, in which the spindle 14 rotates, has a peak exceeding 2 μm. In the period between four and five hours of elapsed time, the displacement of the spindle 14 has a peak exceeding than −4 μm. Further, when the rotation speed of the spindle 14 increases stepwise at four and half hours of elapsed time, the displacement of the spindle 14 greatly fluctuates. It is thus obvious that the second example (d) and the third example (e) are not favorable. Contrastingly, in the fourth example (f) of the expression (10), the displacement of the spindle 14 is within the range of ±2 μm during the period between zero and six and half hours of elapsed time, in which the spindle 14 rotates. The displacement fluctuates by a small amount. It is thus obvious that the expression (10) is effective as the correction expression.

After rotation of the spindle 14 stops in the first example (c) shown in FIG. 6, the absolute value of the displacement is less than those in the second comparison example (b) and the second to fourth examples (d) to (f). Therefore, the expression (3) of the first embodiment is effective even after the rotation speed of the spindle 14 stops.

Figure 7:
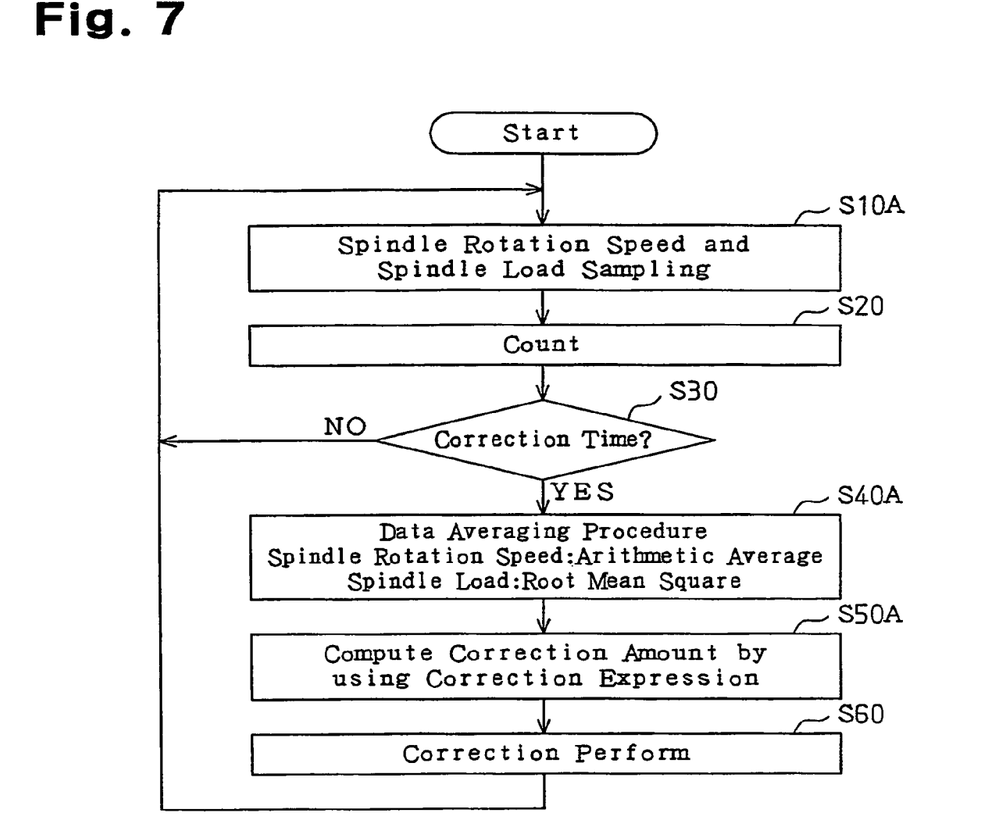
FIG. 7 is a flowchart showing a thermal displacement correction program executed by a CPU 110 according to a second embodiment of the present invention.

A second embodiment according to the present invention will now be described with reference to FIGS. 7 to 9. The second embodiment is different from the first embodiment in a part of the flowchart of the thermal displacement correction that is executed by the CPU 110 according to a thermal displacement correction program. Specifically, the CPU 110 of the second embodiment executes step S10A, step S40A, and step S50A instead of step S10, step S40, and step S50.

At step S10A, the CPU 110 samples the rotation speed of the spindle 14 based on a rotation pulse signal from the rotation speed sensor 370 for the spindle 14. Further, the CPU 110 samples the load on the spindle 14, that is, the absolute value of the current value of the spindle motor 350, based on a detection signal of the motor current of the spindle motor 350 from the current sensor 360. The current sensor 360, which detects the current of the spindle motor 350, detects a detection section of the load on the spindle 14.

At step S40A, the CPU 110 performs a data averaging procedure. Specifically, the CPU 110 computes the mean value of the rotation speed of the spindle 14 from the sampled value at step S10A, and sets the mean value to the rotation speed ω of the spindle 14 used in a correction expression at step S50A. Further, the CPU 110 computes the mean value of the load on the spindle 14 from the sampled value at step S10A, and sets the mean value to the spindle load L used in the correction expression at step S50A. The mean value ω of the rotation speed of the spindle 14 is computed as an arithmetic average in this embodiment. Contrastingly, the mean value L of the spindle load is computed as the root mean square.

At step S50A, the CPU 110 computes the correction amount, that is, the current thermal displacement amount $S_n$ using a correction expression (5) below. The expression (5) will now be described.

The current thermal displacement amount $S_n$ that is obtained using the expression (3) in which the rotation speed ω of the spindle 14 and the precedingly estimated thermal displacement amount $S_{n-1}$ are used as variables is an estimated value that is sufficiently appropriate for a machine tool such as a die sinking machine in which the spindle 14 continues rotating at a constant spindle rotation speed ω. However, the load on the spindle motor 350 increases in a machine tool in which the rotation speed ω of the spindle 14 is frequently increased and decreased, for example, in a heavy cutting machine such as a milling machine and a working machine that performs tapping. In such cases, the thermal displacement amount can hardly be accurately estimated using the expression (3). Therefore, it is preferable that an expression having the load on the spindle 14 as a variable be used.

As such an expression, the following equation (5) may be used.

$$S_n = b_1 \cdot S_{n-1} + b_2 \cdot \omega + b_3 \cdot \omega^2 + b_4 \cdot \omega^3 + b_5 S_{n-1} \cdot \omega + b_6 \cdot L + b_7 \cdot L^2 + b_8 \cdot S_{n-1} \cdot L \quad (5)$$

In the expression (5), L represents the load on the spindle 14. For example, the spindle load is preferably the absolute value of the current value of the spindle motor 350. The dimensions of the coefficients $b_1$ to $b_8$ in the expression (5) are set in such a manner that $S_n$ is ultimately computed. The coefficients $b_1$ to $b_8$ in the expression (5) are obtained by performing a regression analysis using various measurement data that are obtained in advance through experiments.

In the expression (5), other than the terms that are included in the above expression (3), a term related to heat generation is the term $b_7 \cdot L^2$. The terms related to heat radiation in the expression (5) are the terms $b_6 \cdot L$ and $b_8 \cdot S_{n-1} \cdot L$.

The term $b_7 \cdot L^2$ is derived from the fact that copper loss, which is a loss of the spindle motor 350, is proportionate to the square of the motor current of the spindle motor 350.

The terms $b_6 \cdot L_1$ and $b_8 \cdot S_{n-1} \cdot L$ is obtained to correspond to the heat radiation state, which varies according to the heat generation condition.

The expression (5) is extremely effective when the machine tool does not deteriorates with time, and the state of the machine tool is maintained.

The characteristics of the second embodiment will now be described.

Figure 8:
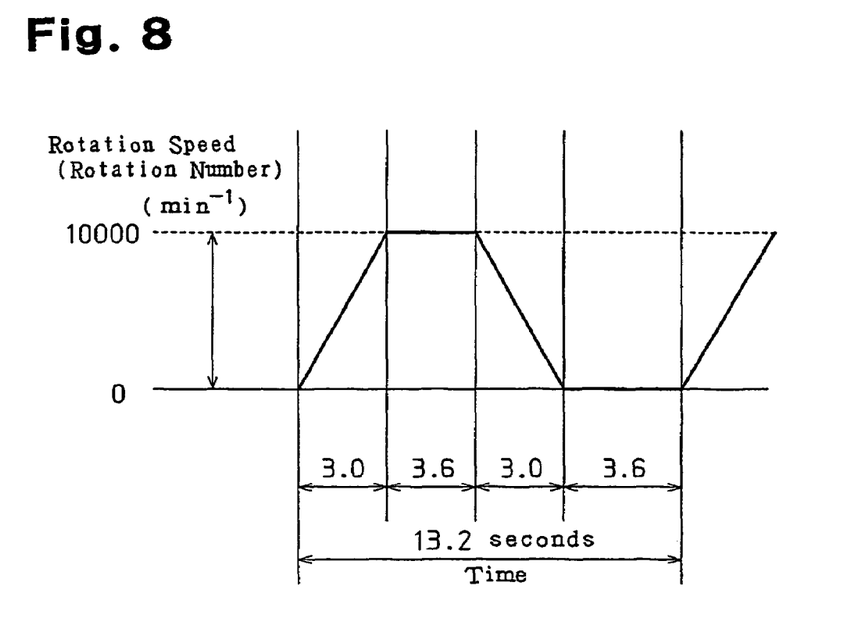
FIG. 8 is a diagram for explaining another pattern of the rotation speed of the spindle motor 350 shown in FIG. 2.
Figure 9:
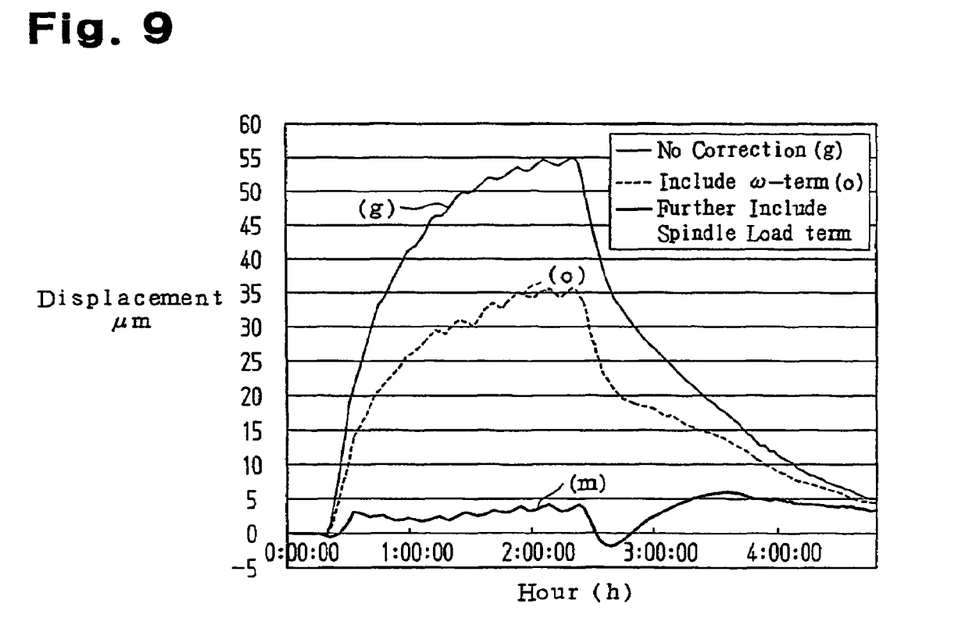
FIG. 9 is a diagram showing an example of the thermal displacement correction according to the program of FIG. 7.

FIG. 9 is a diagram in which the displacement (actual displacement−correction amount) of the spindle 14 along the Z-axis direction in a third comparison example (g), a fourth comparison example (o), and a fifth example (m) are plotted in a case where the rotation speed of the spindle motor 350, that is, the rotation speed of the spindle 14 is repeatedly changed in the pattern shown in FIG. 8. The pattern of FIG. 8 is repeated with a cycle of 13.2 seconds. Specifically, increase and decrease of the rotation speed of the spindle 14 are repeated approximately every six seconds between the stopped state of the spindle 14 and a high rotation speed state of ten thousand rotations per minute. The repetition pattern is started at about twenty minutes of elapsed time on the time axis in FIG. 9, and is ended at two and half hours of elapsed time so that the rotation speed of the spindle 14 becomes zero.

The pattern of the rotation speed of the spindle 14 is suitable for a working machine in which the rotation speed of the spindle 14 is frequently increased and decreased, such as a heavy cutting machine and tapping machines that perform milling.

The third comparison example (g) of FIG. 9 represents a case without correction. The fourth comparison example (o) represents a case where the expression (3) is used as the correction expression for comparison. The fifth example (m) represents a case where the expression (5) is used as the correction expression. In the fifth comparison example (m), in the period where the spindle 14 is rotating with the pattern of FIG. 8, the thermal displacement correction is more favorable than the third comparison example (g) and the fourth comparison example (o).

Figure 10:
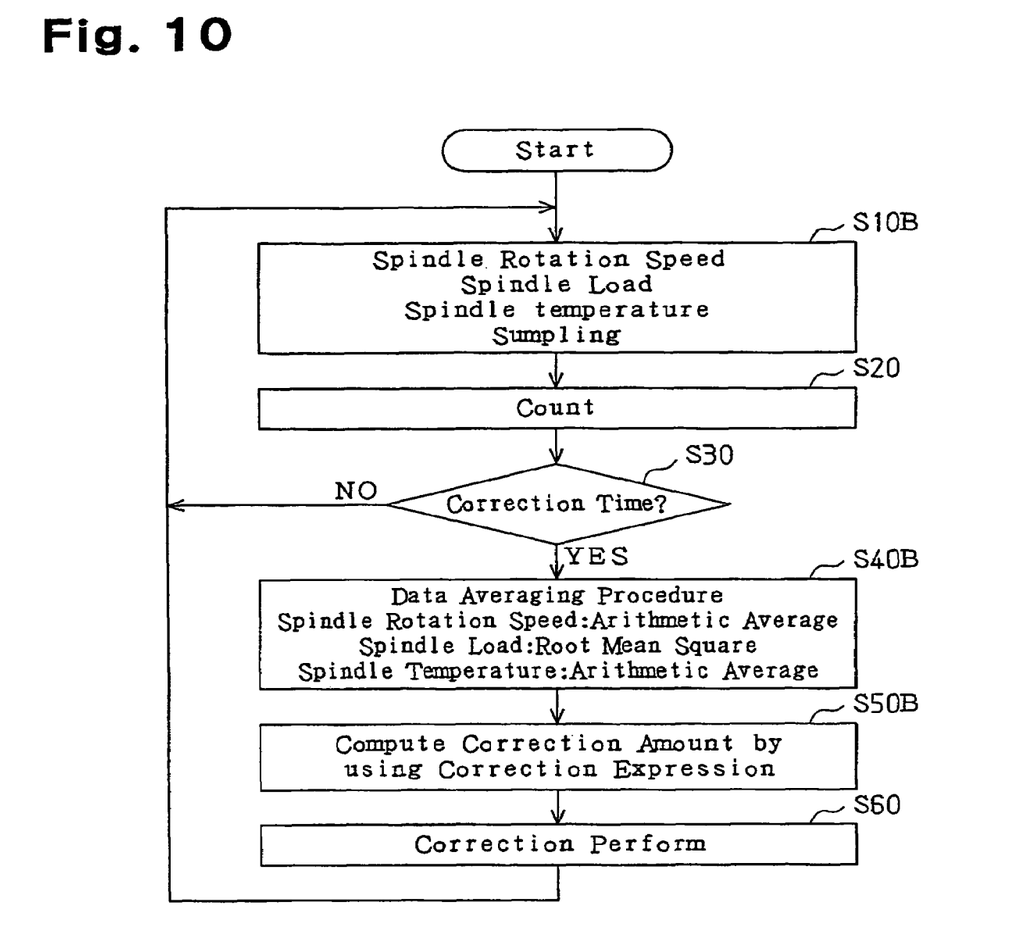
FIG. 10 is a flowchart showing a thermal displacement correction program executed by a CPU 110 according to a third embodiment of the present invention.

A third embodiment according to the present invention will now be described with reference to FIG. 10. The third embodiment is different from the first embodiment in that steps S10B, step S40B, and step S50B are executed instead of steps S10, S40, and S50 in the flowchart of the thermal displacement correction.

At step S10B, the CPU 110 samples the rotation speed of the spindle 14 based on a rotation pulse signal from the rotation speed sensor 370 for the spindle 14. Further, the CPU 110 samples the load on the spindle 14 based on a current detection signal from the current sensor 360. Also, the CPU 110 samples the temperature (measured value) of the spindle 14 based on a temperature detection signal from the temperature sensor 380. The spindle temperature sensor 380 corresponds to a detection section of the temperature of the spindle 14.

At step S40B, the CPU 110 performs a data averaging procedure. Specifically, the CPU 110 computes the mean value of the rotation speed of the spindle 14 based on the sampled value at step S10B, and uses the mean value as the rotation speed ω of the spindle 14 at step S50B. Also, the CPU 110 computes the mean value of the load on the spindle 14 based on the sampled value at step S10B, and uses the mean value as the spindle load L at step S50B. Further, based on the sampled value at step S10B, the CPU 110 computes the mean value of the temperature (measured value) of the spindle 14. Based on the mean value, the CPU 110 computes a mean value and sets the mean value to a spindle temperature $T_a$. The mean value of the rotation speed of the spindle 14 is computed as an arithmetic average in this embodiment. Contrastingly, the mean value of the spindle load L is computed as the root mean square. The spindle temperature $T_a$ is computed as an arithmetic average in this embodiment.

At step S50B, the CPU 110 computes a correction amount using the following correction expression (7). Using the expression (7), the correction amount of the spindle 14, that is, a current thermal displacement amount is computed. The expression (7) will now be described.

The expression (5) is extremely effective when the machine tool does not deteriorates with time, and the state of the machine tool is maintained. However, if liquid of a cooling apparatus evaporates due to deterioration with time of a machine tool, or clogging of a filter of the cooling apparatus degrades the cooling performance of the cooling apparatus, the thermal displacement can hardly be accurately estimated using the expression (5).

In such a case, the temperature of the spindle 14 is preferably estimated using a similar expression as that for estimating the thermal displacement amount $S_n$. The difference between the estimated value of the spindle temperature and the measured value, or the measured temperature, is calculated. The difference is multiplied by a predetermined coefficient to estimate the thermal displacement amount that corresponds to the difference. The thermal displacement amount corresponding to the estimated change in the spindle temperature is preferably added to the thermal displacement amount $S_n$ obtained through the expression (5) to compute the final current thermal displacement amount Un.

In this case, the expression for the estimated spindle temperature is preferably a polynomial obtained through the response surface methodology. For example, a temperature computation expression based on the response surface methodology preferably contains as variables the precedingly estimated spindle temperature $T_{n-1}$, the rotation speed ω of the spindle 14 detected at a predetermined interval, and the spindle load L.

As a temperature computation expression, the following equation (6) may be used.

$$T_n = c_1 \cdot T_{n-1} + c_2 \cdot \omega + c_3 \cdot \omega^2 + c_4 \cdot \omega^3 + c_5 \cdot T_{n-1} \cdot \omega + c_6 \cdot L + c_7 \cdot L^2 + c_8 \cdot T_{n-1} \cdot L \qquad (6)$$

The expression (6) is based on the response surface methodology. The spindle load L in the expression (6) is preferably the absolute value of the current value of the spindle motor 350. The dimensions of the coefficients $c_1$ to $c_8$ are set in such a manner that the estimated spindle temperature $T_n$ is ultimately computed. The coefficients $c_1$ to $c_8$ in the expression (6) are obtained by performing a regression analysis using various measurement data.

The temperature computation expression (6) includes the following terms.

E. a term having the precedingly estimated spindle temperature as a variable ($c_1 \cdot T_{n-1}$), F. a term having the rotation speed of the spindle 14, which is detected at a predetermined interval, as a variable ($c_2 \cdot \omega$), G. a term having the square of the rotation speed of the spindle 14 as a variable ($c_3 \cdot \omega^2$), H. a term having the cube of the rotation speed of the spindle 14 as a variable ($c_4 \cdot \omega^3$), I. a term obtained by multiplying the precedingly estimated spindle temperature by the rotation speed of the spindle 14 ($c_5 \cdot T_{n-1} \cdot \omega$), J. a term having the spindle load as a variable ($c_6 \cdot L$)

K. a term having the square of the spindle load as a variable ($c_7 \cdot L^2$), and M. a term having, as a variable, an amount obtained by multiplying the precedingly estimated spindle temperature by the spindle load ($c_8 \cdot T_{n-1} \cdot L$).

In this manner, by using the response surface methodology, the temperature computation expression (6) is easily realized.

Using the expression (7), the final current thermal displacement amount is obtained.

$$U_n = S_n + K_T (T_a - T_n) \qquad (7)$$

$U_n$ represents the final current thermal displacement amount that has been obtained taking the measured temperature into consideration. $T_a$ represents the measured temperature of the spindle 14, that is, the measured value of the spindle temperature. $K_T$ is a coefficient for obtaining a thermal displacement amount that corresponds to a temperature difference, or the difference ($T_a - T_n$)

If, due to deterioration with time of a machine tool, the cooling performance of the cooling apparatus is degraded, the thermal displacement amount $U_n$ is accurately estimated using the expressions (6) and (7). As a result, the thermal displacement correction is properly performed.

The CPU 110 computes the temperature computation expression (6) before calculating the expression (7). In this case, the coefficients in the expression (6) have been set by performing a regression analysis using various measurement data. The coefficients $b_1$ to $b_5$ in the expression (7) are determined in advance based on test data.

The characteristics of the third embodiment will now be described.

In the third embodiment, the estimated spindle temperature $T_n$ is obtained using the expression (6) based on the response surface methodology. The thermal displacement amount that corresponds to the temperature difference between the estimated spindle temperature $T_n$ and the spindle temperature $T_a$ based on the measured value is added to the thermal displacement amount $S_n$ to obtain the final thermal displacement amount $U_n$ taking the measured temperature of the spindle 14 into consideration.

As a result, even if, due to deterioration with time of the horizontal machining center 10, the cooling performance of the cooling apparatus that cools the spindle 14 is degraded, the thermal displacement of the spindle 14 is accurately corrected.

It should be apparent to those skilled in the art that the present invention may be embodied in many other specific forms without departing from the spirit or scope of the invention. Particularly, it should be understood that the invention may be embodied in the following forms.

At step S60 in the illustrated embodiments, the position control command of the spindle 14 with respect to the Z axis is corrected based on the correction amounts $S_n$, $U_n$ computed using the correction expressions (3), (5), (6), and (7).

Alternatively, the point of origin of the Z axis in the machine coordinate system based on the correction amounts $S_n$, $U_n$.

In the illustrated embodiments, the present invention is applied to the horizontal machining center 10, in which the horizontally extending spindle 14 rotates the working attachment 22. However, the present invention may be applied to other types of machine tools such as a vertical machining center in which the spindle 14 extends vertically and a milling machine. Alternatively, the present invention may be applied to a machine tool in which the spindle 14 rotates a workpiece W.

Therefore, the present examples and embodiments are to be considered as illustrative and not restrictive and the invention is not to be limited to the details given herein, but may be modified within the scope and equivalence of the appended claims.

What is claimed is:

1. A method for correcting thermal displacement of a machine tool having a rotation spindle, comprising:
   detecting a rotation speed of the spindle;
   detecting a load on the spindle;
   estimating a thermal displacement amount of the spindle in the current cycle of execution of a program by using an arithmetic expression that is based at least on the spindle rotation speed, the spindle load, and a thermal displacement amount that has been estimated in the preceding cycle of execution of the program; and
   using the estimated thermal displacement amount in the current cycle as a correction amount for canceling the thermal displacement of the spindle.

2. The method according to claim 1, wherein a first member is attached to the spindle, the first member being one of a working attachment and a workpiece, a second member, which is the other one of the working attachment and the workpiece, is arranged to face the spindle, wherein the machine tool includes a feed rod for moving the first member or the second member,
   the method further comprising controlling the feed rod in such a manner as to correct a relative position relationship between the first member and the second member based on the correction amount.

3. The method according to claim 1, further comprising:
   detecting a temperature of the spindle;
   estimating an estimated spindle temperature in the current cycle of execution of the program by using a temperature computation expression that is based on the spindle rotation speed and an estimated spindle temperature that has been estimated in the preceding cycle of execution of the program; and
   estimating the thermal displacement amount in the current cycle by using an arithmetic expression that is based on the spindle rotation speed, the precedingly estimated thermal displacement amount, the spindle load, and a difference between the estimated spindle temperature estimated in the current cycle of execution of the program and the detected spindle temperature.

4. The method according to claim 1, wherein the arithmetic expression for estimating the thermal displacement amount in the current cycle at least includes the following terms a) to d):
   a) a term having the precedingly estimated thermal displacement amount as a variable;
   b) a term having the rotation speed of the spindle, which is detected at a predetermined interval, as a variable;
   c) a term having the square of the spindle rotation speed as a variable; and
   d) a term having the cube of the spindle rotation speed as a variable.

5. The method according to claim 4, wherein the arithmetic expression for estimating the thermal displacement amount in the current cycle further includes a term having, as a variable, an amount obtained by multiplying the spindle rotation speed by the precedingly estimated thermal displacement amount.

6. The method according to claim 1, further comprising obtaining the arithmetic expression for estimating the thermal displacement amount in the current cycle based on a response surface methodology.

7. The method according to claim 3, further comprising obtaining the temperature computation expression for estimating the estimated spindle temperature in the current cycle based on a response surface methodology.

8. An apparatus for correcting thermal displacement of a machine tool having a rotation spindle, the apparatus comprising:
   a spindle rotation speed detection section for detecting a rotation speed of the spindle;
   a spindle load detection section for detecting a load on the spindle;
   a thermal displacement estimation section for estimating a thermal displacement amount of the spindle in the current cycle of execution of a program by using an arithmetic expression that is based at least on the spindle rotation speed, the spindle load, and a thermal displacement amount that has been estimated in the preceding cycle of execution of the program; and
   a correction section for using the estimated thermal displacement amount in the current cycle as a correction amount for canceling the thermal displacement of the spindle.

9. The apparatus according to claim 8, wherein a first member is attached to the spindle, the first member being one of a working attachment and a workpiece, a second member, which is the other one of the working attachment and the workpiece, is arranged to face the spindle, wherein the machine tool includes a feed rod for moving the first member or the second member, wherein the correction section controls the feed rod in such a manner as to correct a relative position relationship between the first member and the second member based on the correction amount.

10. The apparatus according to claim 8, further comprising a spindle temperature detection section for detecting a temperature of the spindle,
    wherein the thermal displacement estimation section:
    estimates an estimated spindle temperature in the current cycle of execution of the program by using an estimated spindle temperature computation expression that is based on the spindle rotation speed and an estimated spindle temperature that has been estimated in the preceding cycle of execution of the program; and
    estimates the thermal displacement amount in the current cycle by using an arithmetic expression that is based on the spindle rotation speed, the precedingly estimated thermal displacement amount, the spindle load, and a difference between the estimated spindle temperature estimated in the current cycle of execution of the program and the detected spindle temperature.

11. The apparatus according to claim 8, wherein the arithmetic expression for estimating the thermal displacement amount in the current cycle at least includes the following terms a) to d):

a) a term having the precedingly estimated thermal displacement amount as a variable;
b) a term having the spindle rotation speed, which is detected at a predetermined interval, as a variable;
c) a term having the square of the spindle rotation speed as a variable; and
d. a term having the cube of the spindle rotation speed as a variable.

12. The apparatus according to claim 11, wherein the arithmetic expression for estimating the thermal displacement amount in the current cycle further includes a term having, as a variable, an amount obtained by multiplying the spindle rotation speed by the precedingly estimated thermal displacement amount.

13. The apparatus according to claim 8, wherein the arithmetic expression for estimating the thermal displacement amount in the current cycle is obtained based on a response surface methodology.

14. The apparatus according to claim 10, wherein the temperature computation expression for estimating the estimated spindle temperature in the current cycle is obtained based on a response surface methodology.

15. A method for correcting thermal displacement of a machine tool having a rotation spindle, comprising:
  detecting a rotation speed of the spindle;
  estimating a thermal displacement amount of the spindle in a current cycle of execution of a program by using an arithmetic expression that at least includes the following terms a) to d):
  a) a term having a thermal displacement amount that has been estimated in a preceding cycle of execution of the program as a variable;
  b) a term having the rotation speed of the spindle, which is detected at a predetermined interval, as a variable;
  c) a term having the square of the spindle rotation speed as a variable; and
  d) a term having the cube of the spindle rotation speed as a variable; and
  using the estimated thermal displacement amount in the current cycle as a correction amount for canceling the thermal displacement of the spindle.

* * * * *